United States Patent [19]

Hanisch et al.

[11] Patent Number: 5,066,863

[45] Date of Patent: Nov. 19, 1991

[54] ASCERTAINING HIGH ENERGY RADIATION

[75] Inventors: Ferdinand Hanisch, Burgwedel; Eckard Schleese, Stadthagen, both of Fed. Rep. of Germany

[73] Assignee: Kabelmetal Electro GmbH, Hanover, Fed. Rep. of Germany

[21] Appl. No.: 439,035

[22] PCT Filed: Feb. 24, 1989

[86] PCT No.: PCT/DE89/00108

§ 371 Date: Nov. 1, 1989

§ 102(e) Date: Nov. 1, 1989

[87] PCT Pub. No.: WO89/08267

PCT Pub. Date: Sep. 8, 1989

[30] Foreign Application Priority Data

Mar. 3, 1988 [DE] Fed. Rep. of Germany ....... 3806867

[51] Int. Cl.⁵ .......................... G01T 1/04; G01T 3/00
[52] U.S. Cl. ................................................. 250/474.1
[58] Field of Search ..................................... 250/474.1

[56] References Cited

U.S. PATENT DOCUMENTS

| 3,663,390 | 5/1972 | Fergason et al. | 250/474.1 |
| 3,710,109 | 1/1973 | Chalkley | 250/474.1 |
| 3,787,687 | 1/1974 | Trumble | 250/474.1 |
| 4,001,587 | 1/1977 | Panchenkov et al. | 250/474.1 |
| 4,668,714 | 5/1987 | Morita et al. | 523/136 |
| 4,829,187 | 5/1989 | Tomita et al. | 250/474.1 |

OTHER PUBLICATIONS

Chadsey et al., "Radiation-Induced Signals in Cables", IEEE Transactions on Nuclear Science, Nr. 6, Dec. 1976, 1933-1941.

T. Kojima et al., "Alanine Dosimeters Using Polymers As Binders", Applied Radiation & Isotopes, vol. 37, No. 6, 1986, Pergamon Journals Ltd., pp. 517-520.

Primary Examiner—Constantine Hannaher
Assistant Examiner—Edward J. Glick
Attorney, Agent, or Firm—Ralf H. Siegemund

[57] ABSTRACT

The integral absorbed local dose of ambient high-energy radiation is measurred by means of a moulded cord (1) made of extrudable materials, which is self-supporting or can be incorporated in an elongated object such as an electric cable, pipe or the like. These materials contain substances which undergo an optical change and/or modification of their molecular structure under the influence of a high-energy radiation. Sections (2) are taken from the moulded cord (1) and the radiaiton dose absorbed is measured.

28 Claims, 2 Drawing Sheets

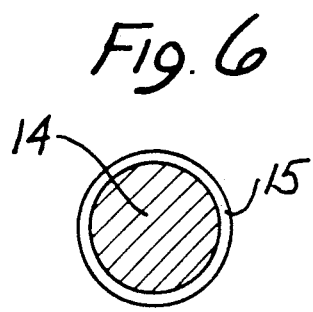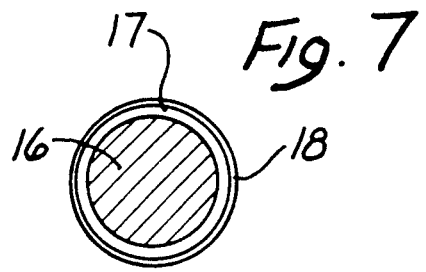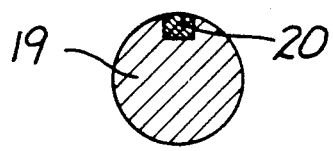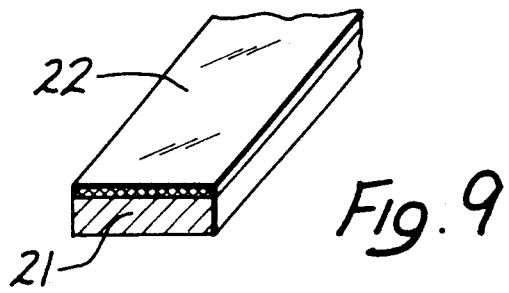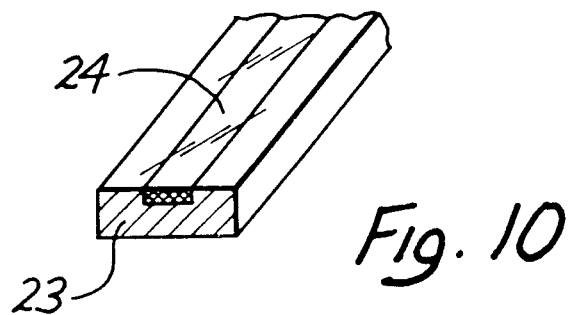

ASCERTAINING HIGH ENERGY RADIATION

BACKGROUND OF THE INVENTION

The present invention relates to a device for ascertaining the integral value of the local dosage of ambient high energy radiation.

The increasing employment in industry of high energy radiation for a large variety of purposes and the undesired appearance of such radiation in, for example, high energy particle accelerators, has justifiably necessitated consideration of monitoring. Here it is particularly important to ascertain the radiation dosage which, for instance, a human body has received on a cumulative basis in order to provide conclusions about possible injuries and possible reduction in quality in products on account of such radiation load.

In conjunction with the foregoing one has ascertained (see e.g. Nuclear Technology Publishing, RADIATION PROTECTION DOSIMETRY, vol. 9, No. 4, pp. 227281 of 1984) that it is practical and reasonable to provide for a measurement technique based on paramagnetic properties of the amino acid alanine. It was found that alanine, when subjected to higher energy radiation, forms long lasting free radical points and loci which constitute an indication of the respective local radiation received.

This general discovery, however, has not yet yielded particularly simple and comparatively economic devices or arrangements for ascertaining the radiation load. Therefore in many instances when high energy radiation has to be used in research or production, uncertainty still exists about the radiation load in any particular area and/or within any specific volume, room or the like. Hence, uncertainty exists concerning the expected use life of the equipment exposed to such radiation under the assumption that certain deterioration continues on a cumulative basis. This includes engineering efforts in the field of electrical cable specifically involving supply decontamination. In the case of damage, consequential damages may arise to a considerable extent.

DESCRIPTION OF THE INVENTION

It is an object of the present invention to provide for the feasibility of ascertaining the existing radiation dosage in any area within any room or in relation to any particular product.

In accordance with the preferred embodiment of the present invention it is suggested to provided a self carrying or integratable, shaped strand, being integratable into strand elongated stock such as electrical cable, tubes, or the like and being made of an extruded material containing substances which provide an optically visible change and/or otherwise detectible modification of its molecular structure when subjected to high energy radiation, thus constituting a radiation integrator. The inventive, elongated radiation integrator or integrating detector will either be associated with stock to be monitored in close proximity thereto; or physically connected or integrated and/or actually be a part of this stock. Such elongated objects generally can be manufactured in any length but can also be installed in areas in which nuclear radiation may appear either as a known fact or on the basis of any assumption. Elongated stock may e.g. be provided as electrical cable, as power supply lines or as decontaminant lines to be installed in guide chutes or the like. The integrating radiation indicator, either separately or as stated in the physically integrated or combined fashion concerning existing tubes, cable or the like may be used in that, from time, to time in that pieces (samples) are simply cut from the shaped strand in order to ascertain the radiation dosage this particular cut-off portion has received. It is not essential in principle to provide for a regular inspection in this fashion, which is particularly so if, on the one hand, the area is accessible and if on the other hand indication of any optical-visual change is additionally provided for as an observable phenomenon. Here then visual inspection may be sufficient in order to determine whether or not there was any kind of radiation exposure at all; if some exposure is visibly detected in this fashion one may cut off a certain portion of the integrator in order to provide for a more quantitative ascertainment of the dose that was received.

The invention thus permits in a simple fashion control and monitoring of high energy radiation in plants, devices or the like. The invention is particularly applicable in plants having electrical cables in which cross linking of the cable insulation occurs through exposure to high nuclear or high energy radiation. Here one may run the particular shaped strand as per the invention through the equipment, together with the cable to be cross linked. The radiation received by the equipment including the monitoring shaped strand can be ascertained therewith, in turn permitting the simple drawing of conclusions as to the correct working of the cable making equipment just as in cases where an optimization is necessary for obtaining cross linking through the exposure of radiation but with varying outer dimensions and/or materials.

Other examples for radiation equipment employ so-called Co sources for gamma radiation, sterilizing large areal parts or coating materials.

The substances which can be used because their molecular structure undergoes variation and modification when exposed to high nuclear radiation are basically of any kind, provided they can be extruded. Among the known substances alanine was mentioned in the introduction and it is believed that this particular material is particularly suitable for the inventive purposes and is deemed to be the preferred material of employment for the inventive purpose.

In the case of optical change, one will use with advantage, radiation-sensitive pigments or dyes which have been added to the material of the shaped strand and is extruded together therewith. Here it was found that triphenyl-methyl-cyanide is particularly suitable as a dye.

In order to enhance the effectiveness of the shaped strand in accordance with the present invention, it is suggested that the base material for the extruded material be a blend filled to a high degree with alanine. The base material for the extrusion may e.g. be a thermoplastic caoutchouc such as TPR or an ethylene-propylene caoutchouc wherein with reference to 100 parts/weight polymer, 30-800 parts of alanine, are added between 100-200 parts/weight alanine being the preferred range. In addition, however, one could use as base material polyolefine or an olefine polymerisate blend or a blend of an elastifying component, probably containing certain softening agents and stabilizers and so forth.

In the latter case, optical changes in the appearance of the inventive shaped strand is to be used either by itself or in combination with changes in molecular structure, to serve as indicator for exposure to high energy radiation, one will use as base material for the extruded material a polymer or polymer blend which, owing to the particular adjusting polarity as far as sensitivity is concerned, provides a specific change in color when exposed to radiation, and the pigment may be up to 10% of the total blend.

The shaped strand in accordance with the invention being either used by itself or in conjunction with other elongated stock, may either be of solid cross section which, however, is of no immediate consequence as far as the contour is concerned; it may be round, polygonal, square shaped or the like. It is only important that the particular shaped strand can in fact be made by extrusion. On the other hand, a hollow configuration may well be advisable in certain cases. The decisive aspect as far as the cross section geometry is concerned is that of employment.

Of particular advantage is to provide the shaped strand in a multilayer or multi-ply configuration; the cross section may be solid or hollow. Here the individual layers may be arranged in a concentric relationship. An arrangement of this kind is particularly important in the cases of a circular cross section. If the shaped strand has a configuration of a ribbon, one wants to have a multilayer configuration in which, of course, the layers are arranged one on top of the other. The advantage of a multilayer or multi-ply configuration of either kind is to be seen primarily in that one can combine in a single indicator unit the optical variation aspect with the feature of change of molecular structure. Some of the layers should contain alanine while others a radiation-sensitive pigment.

In order to render visible the effect of exposure to high energy radiation, the outer layer, in the case of multilayer configuration, will contain the radiation sensitive pigment. In this case it was found advantageous to provide, in addition, a transparent cover which includes an ultraviolet absorber. The pigment is now protected against ultraviolet radiation.

Not just entire layers or lays are involved in the inventive shaped strand which contain substances responding to high energy radiation. In furtherance of the invention, the material containing the alanine and/or any other substance whose molecular structure is changed, may be provided in the forms of strips on or in a shaped strand. These strips may run longitudinally or helically, or they can be configured as closed annuli and are arranged next to each other in axial direction along the shaped strand and are mutually spaced in that fashion.

If the shaped strand is to be configured to be of a self carrying nature it is particularly advantageous in furtherance of the invention if the shaped strand contains a thin wall, closed cover or sleeve, made of a polymer material which has particularly advantageous mechanical strength properties. Another advantage follows from extrusion of the sleeve resulting in a smooth surface which is of particular use if such a shaped strand is installed in narrow chutes or on cable strands or the like, requiring such a smooth surface. In connection therewith it may be of advantage to provide the thin wall sleeve also as an extrudable material which is to a high extent abrasion-proof. Here for example high density polymer ethylene, polypropylene, polyurethane or a material of this nature, by itself or in a blend, is quite suitable.

If the tensile strength of the shaped strand is of particular interest one may include in the shaped strand a material such as threads or strings of particular high tensile strength; for example this could be a synthetic thread made on the basis of polyamide or polyaramide including particularly threads known under the trade name KEVLAR.

On the other hand if the shaped strand in accordance with the invention is not made in a self carrying configuration but is integrated in other elongated stock, then it is particularly advantageous if the shaped strand is arranged in or on the stock as part of an outer jacket, in terms of longitudinally running bars, ridges, ribs or the like. These bars, ribs or ridges can be extruded in a simple fashion together with the coating or jacket material of the principal product. In addition, one may wish to provide for subsequent extrusion of the rib or bar onto an existing elongated object.

DESCRIPTION OF THE DRAWINGS

The invention will be explained more fully in conjunction with blended example as described next as well as in a junction with embodiments shown in FIGS. 1 to 10.

FIGS. 2 and 3 and 6, 7 and 8 are modified cross sections through elements of the kind shown in FIG. 1;

FIGS. 9 and 10 are isometric section views through ribbon or strip material constructed in accordance with the preferred embodiment of the present invention.

EXAMPLE I 100 parts/weight thermoplastic caoutchouc, 100 parts/weight alanine.

EXAMPLE II 100 parts/weight polyethylene copolymer (density of 0.92 and a vinyl acetate content of 8%) 100 parts/weights alanine.

EXAMPLE III 100 parts/weight of a copolymer of alpha olefine known also under the designation VLDPE with a density of 0.895, and 200 parts/weight alanine.

EXAMPLE IV 100 parts/weight ethylene-propylene-caoutchouc, 30 parts/weight softener or plasticizer, 4 parts/weight stabilizer and 200 parts/weight alanine.

EXAMPLE V 100 parts/weight polyethylene copolymer, 0.1 to 0.6 parts/weight triphenyl-methyl-cyanide.

Figure 1:
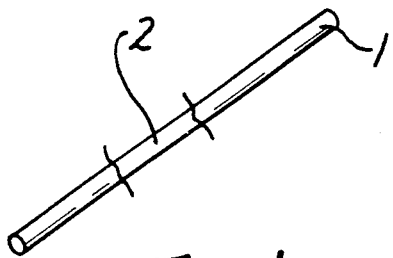
FIG. 1 shows a portion of a simple shaped strand in accordance with the preferred embodiment of the present invention as a self contained element.
Figure 1A:
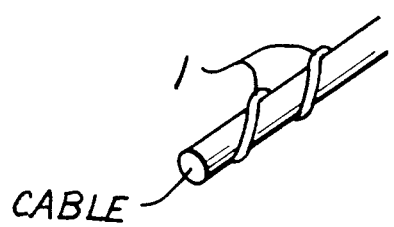
FIG. 1a shows use of that strand on a cable.

Feasible configurations are shown in the figures. FIG. 1 illustrates for example a shaped strand 1 made of a material as per example II above and which is installed together with a different cable (not shown) or is run in the vicinity of the object to be monitored concerning radiation doses. Alternatively shaped strand 1 may be placed next to an object such as a piece of equipment which is exposed to high energy radiation. The synthetic shaped strand 1 may thus be juxtaposed to the object to be monitored. In the case of an electric cable or any other supply line the shaped strand 1 may e.g. be run helically around the cable (see FIG. 1a). As is also shown schematically, once in a while a certain small section 2 is cut from the shaped strand and simply analyzed in a known manner with regard to the radiation dosage that has been received.

Figure 2:
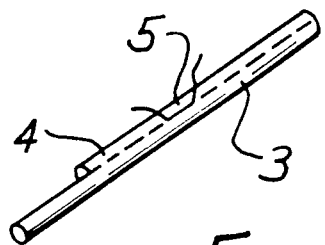

FIG. 2 shows a piece of elongated stock 3 which is provided with a rib 4 extending longitudinally. This rib 4 is attached to the shaped strand 3 in any manner either continuously or in isolated spots. This rib 4 is a blend made in accordance with example 1. Elongated stock 3 such as an electrical cable is used for energy transmission or in communication, or it may be a supply line for a liquid or discharge line for contaminants or the like. Also occasionally a sample 5 is cut off the rib 4 in order to ascertain the radiation doses it may have received since its installation.

Figure 3:
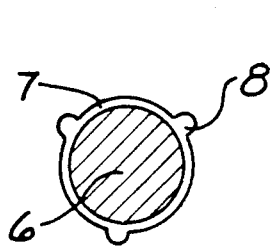

A physical combining of the ribs on or around the periphery of the stock to be monitored as shown in FIG. 3 is advantageous from the point of view of manufacturing. The core 6 of an energy and power supply cable of any configuration is covered by the jacket 7. As the jacket is extruded onto this core, additional ribs or bars 8 are formed by co-extrusion to run longitudinally to that cable jacket as part thereof. The material that is included in these ridges or ribs 8 is chosen as per example III above and will contain alanine as the metering agent for monitoring any exposure to high energy radiation. The measurement is carried out as outlined above, once in a while certain sample pieces of the ribs being cut off and tested for determining what dosage of radiation has been accumulated.

Figure 4:
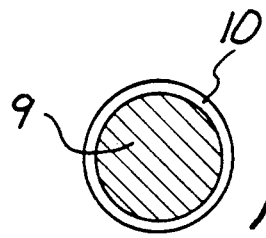
FIG. 4 and 4a illustrate respectively solid and hollow strands in accordance with the preferred embodiment of the present invention and as they could be attached to any other object.

FIG. 4 illustrates the feasibility of increasing the mechanical stability of an alanine containing blend for making a shaped strand of the kind shown in FIG. 1. In order to provide this additional protection for the shaped strand 9 a thin wall sleeve 10 made of a synthetic is provided to cover that particular shaped strand. This sleeve serves as an abrasion proofing outer skin. In terms of volume and based on the diameter of the entire strand, this outer jacket will amount to only about 30%.

Figure 4A:
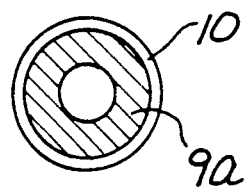

FIG. 4a shows a hollow core 9a rather than a solid one.

Figure 5:
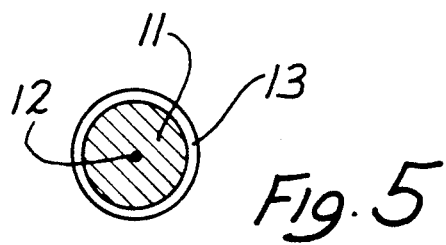
FIG. 5 is a cross section through an integrated cable shaped strand in accordance with the preferred embodiment of the present invention.

In the FIG. 5 an embodiment is illustrated wherein for optimizing the transmission of force upon insertion into narrow channels or the like, a thread 12 is placed into the strand 11. This thread 12 is suited for taking up the rather high forces during exertion of tension upon the shaped strand. In addition, the abrasion-proof cover 13 may be provided just as in the previous examples.

In the previous examples it was pointed out that after certain periods of time sections are cut from the inventive shaped strand and are subjected to testing. This fixing of predetermined time intervals and testing of substances which may not yet have been measurably influenced by radiation, can be avoided if, in accordance with the invention, additional substances are used which, under the influence of a high energy radiation already optically indicate a reaction. Such embodiments of the invention are shown in FIG. 6-10.

FIG. 6 shows a shaped strand of round cross section made of an extrudable alanine containing core 14 and another layer 15 is deposited on top thereof. Layer 15 represents a radiation sensitive pigment, e.g. triphenyl-methyl-cyanide as given in the above example V. Originally the pigment layer 15 is colorless and will receive a colorization as high energy radiation is being absorbed. The intensity of the colorization may, to a skilled observer, be a fairly accurate indication of the amount of energy that was received. It is of course apparent that it will make sense to cut off and to analyze any sample only after a colorization in layer 15 is observed as a direction of the process of high energy radiation. In other words one will inspect from time to time more or less frequently the layer 15 and if there is no colorization observed then it is pointless to cut the sample from the shaped strand 14. Only after a noticeable colorization is present then a more detailed and finer analysis may be desirable and required. Then in order to ascertain the actual quantitative radiation dosage, a portion will be cut off the shaped strand 14 and subjected to measurement.

FIG. 7 deviating from the foregoing FIG. 6, shows a particular example wherein a core 16 is provided containing alanine in any of the blends mentioned above and a layer 17 is concentrically arranged to that core 16. This particular layer 17 contains a radiation sensitive pigment in the order of 0.5 to 2 parts/weight to 100 parts/weight polymer. In addition a transparent outer cover made of transparent material 18 is provided on top which establishes primarily a mechanical protection for the layer 17. However, in addition the layer 18 may be provided to absorb ultraviolet radiation so that such a radiation will not provide discolorization of the layer 17 and thereby falsify an indication as far as indication of high energy radiation is concerned.

The pigment included in the layer providing optical indication for the radiation does not have to be placed in a concentric layer around a round cross-section but may have a different configuration. As shown by way of example in FIG. 8, the reference numeral 19 is provided as the shaped strand containing alanine, as described above with its sloping longitudinal strip 20. This strip 20 is now made of material basically the same host material to which is added the radiation sensitive pigment. Otherwise the situation is analogous to the one described above with reference to FIG. 7. By way of example a protective layer such as 18 in FIG. 7 may also be provided on top of the layer 8.

In the various examples above it was assumed that the strands may have any cross-sectional configuration, aside from a circular cross section as described, other configurations such as a strip configuration can be used. Such an example is shown in FIG. 9. The layers or strata 21 are one on top of the other whereby layer 21 is a host that includes the alanine alanin material made as per example II. The layer 22, on the other hand, is configured as per example V above and includes the color responsive dye of course. Further layers may be provided such as layers for mechanical strength enhancement or for other stabilization, or layers may be added to make it easier to install the shaped strand or to protect the radiation sensitive layer 22 against mechanical wear. In addition, tensile-proof threads may also be included to enhance as was explained with reference to FIG. 5 be included here to enhance as explained with reference to FIG. 5 to and further increase the tensile strength of the configuration.

FIG. 10, finally, shows an example by means of which a basic shaped strand 23 is provided with a groove and a longitudinal strip 24 laid in that groove.

Depending on the dimension of the partial shaped strand 23 and 24 either the longitudinal or the remainder of the shaped strand will include alanine or the like, and the other one will include the radiation responsive pigment in order to utilize their properties for measuring high energy radiation.

We claim:

1. Device for ascertaining the integral and cumulative dosage of high energy radiation to be ascertained in particular locations comprising, an extruded strand element of elongated construction of selectible length that has been cut from a considerably longer strand, and including a polymeric host material; alanine added to the host, said alanine undergoes molecular changes subject to detection; and a pigment included in the strand, which undergoes optical variations which are visible on exposure to high energy radiation.

2. Device as in claim 1, said pigment being triphenyl-methyl-cyanide.

3. Device as in claim 1, a host material for the extrusion material being thermoplastic caoutchouc to which 30 to 800 parts/weight alanin are added per 100 parts/weight polymer host material.

4. The improvement as in claim 1, a host material is a thermoplastic caoutchouc, a polyolefine or a polyolefine polymerisate to which in relation to 100 parts/weight polymer 0.1 to 10 parts/weight triphenyl-methyl-cyanide is added.

5. The device as in claim 1 wherein the strand has a solid cross section.

6. The device as in claim 1, wherein the strand has hollow cross section.

7. The device as in claim 1, further including a high tensile string.

8. The device as in claim 1, wherein the cross section is of a multilayer configuration.

9. The device as in claim 8, the layers being concentric in relation to each other.

10. Device as in claim 8, wherein the multilayer configuration has a first inner layer which includes alanin, and another, outer layer including a radiation sensitive pigment.

11. Device as in claim 1, wherein a layer that contains the optically responsive additive is covered by a transparent protective cover.

12. Device as in claim 11, wherein said protective cover is or includes an ultraviolet absorbing radiation substance.

13. The device as in claim 1, the pigment and the alanine being present in a physically confined configuration.

14. The device as in claim 13, the configuration being a plurality of multilayer strips.

15. The device as in claim 13, the configuration being a multilayer strip.

16. The device as in claim 13, the configuration being a concentric one.

17. Device for ascertaining the integral value of local dosage of high energy radiation to be used in conjunction with elongated stock being extruded or having extrudable components, electrical cable, or tubes said elongated stock having a particular polymeric layer, the improvement of at least a portion of said polymeric layer constructed to have the following additives: alanine which undergoes molecular changes upon being exposed to high energy radiation and a pigment which undergoes optical response variations to have a change in appearance upon being exposed to high energy radiation.

18. Device as in claim 17, said pigment being triphenyl-methyl-cyanide.

19. Device as in claim 17, a host material for the extrusion material being polyolefine or polyolefine polymerisate blend wherein per 100 parts/weight polymer, 30 to 800 parts/weight alanin has been added.

20. The improvement as in claim 17, a host material is a thermoplastic caoutchouc, polyolefine or a polyolefine polymerisate to which in relation to 100 parts/weight polymer 0.1 to 10 parts/weight triphenyl-methyl-cyanide is added.

21. The device as in claim 17, wherein said portion is one of a plurality of ribs.

22. The device as in claim 17, the portion being provided is axially separated annulus.

23. Device for ascertaining exposure to high energy radiation in a cumulative integrated fashion to be made a component of a piece of elongated stock, cable or tube, the improvement of integrated string means attached to or integral with said elongated stock and including the following substances: alanine which undergoes molecular variations upon being exposed to nuclear radiation with an increase in the change of said structure as the dosage of such radiation increases, and a pigment that exhibits an optical appearance change and which likewise increases with increasing cumulative dosage of such radiation.

24. Improvement as in claim 23, said pigment being triphenyl-methyl-cyanide.

25. Device as in claim 23, a host material for the extrusion material being ethylene propylene caoutchouc and wherein per 100 parts/weight polymer, 30 to 800 parts/weight alanin has been added.

26. The improvement as in claim 23, a host material is a thermoplastic caoutchouc, a polyolefine or a polyolefine polymerisate which in relation to 100 parts/weight polymer 0.1 to 10 parts/weight triphenyl-methyl-cyanide is added.

27. The device as in claim 23, wherein said integrated string means is one of a plurality of ribs.

28. The device as in claim 23, the string means being helical.

* * * * *